Figure 1:
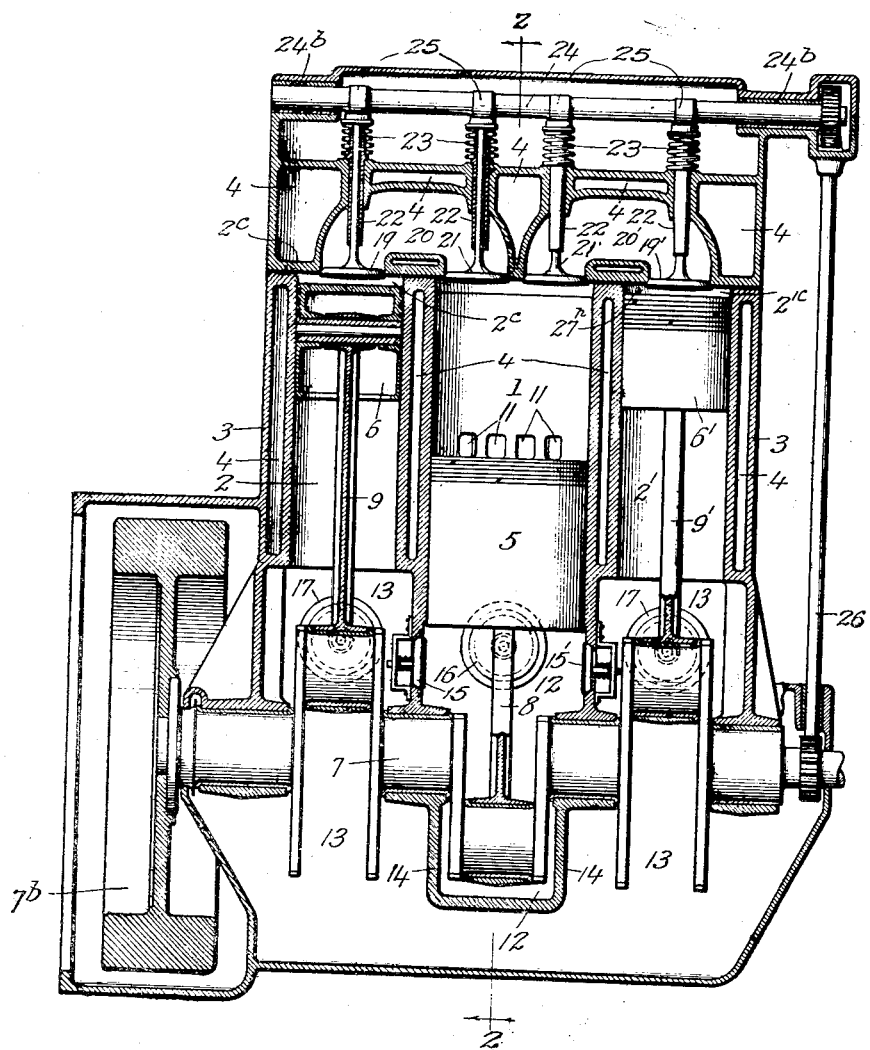

W. G. GERNANDT.
COMPOUND QUICK COMBUSTION ENGINE.
APPLICATION FILED DEC. 16, 1918.

1,347,087.

Patented July 20, 1920.
2 SHEETS—SHEET 1.

Inventor
Waldo G. Gernandt
By Charles Turner Brown
Atty.

W. G. GERNANDT.
COMPOUND QUICK COMBUSTION ENGINE.
APPLICATION FILED DEC. 16, 1918.
1,347,087.
Patented July 20, 1920.
2 SHEETS—SHEET 2.
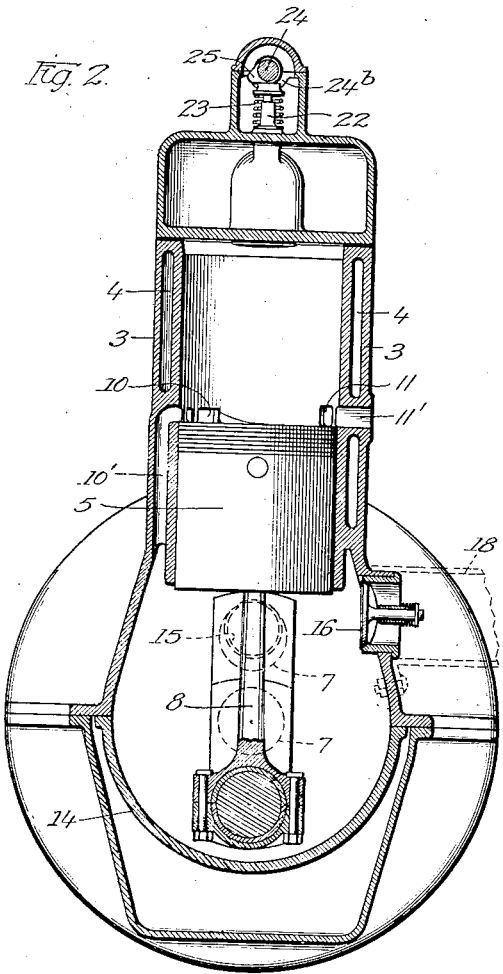
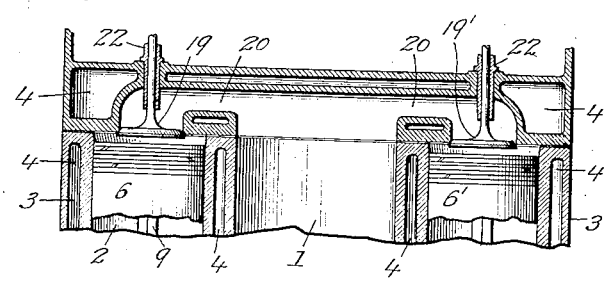

UNITED STATES PATENT OFFICE.

WALDO G. GERNANDT, OF CHICAGO, ILLINOIS.

COMPOUND QUICK-COMBUSTION ENGINE.

1,347,087.  Specification of Letters Patent.  Patented July 20, 1920.

Application filed December 16, 1918. Serial No. 266,911.

*To all whom it may concern:*

Be it known that I, WALDO G. GERNANDT, a citizen of the United States, and a resident of Chicago, in the county of Cook and State of Illinois, have invented certain new and useful Improvements in Compound Quick-Combustion Engines, of which the following is a specification, reference being had to the drawings which accompany and form a part hereof.

This invention relates to quick combustion engines of the high and low compression type; that is, to engines in which the fuel is injected into gas under pressure in the combustion chamber of the engine and there ignited by the heat and over-pressure, and to those where a combustible mixture is obtained by means of a carbureter, put under pressure in the combustion chamber and ignited, as by means of an electric spark.

Objects of this invention are to obtain a compound quick combustion engine which is economical in construction and operation; which comprises few parts, not liable to break or get out of order; an engine which may be effectively run at a high rate of speed, and an engine the operation and management whereof is easily understood by persons not particularly skilled in the art.
A further object is to obtain an engine, of the type named, which is adapted for use with a carbureter and an ignition plug, with a fuel injector substituted for said carbureter and ignition plug, and with a carbureter and ignition plug and a fuel injector, as preferred.

An additional object is to obtain a high speed quick combustion engine which is of comparative light weight for the horse power developed thereby; and which occupies limited space in view of said horse power.

In each unit of a construction embodying this invention, in the drawing referred to, a single two cycle cylinder and piston and a plurality of four cycle cylinders and pistons are illustrated.

The function of the two cycle cylinder and piston is varied from the usual function thereof, in that there is no ignition therein, it being driven on each power cycle thereof by exhaust gases from the four cycle cylinders, and on the compression cycle the compressed charge thereof, whether the same be a fuel mixture or air, being delivered therefrom to a cylinder of the four cycle type, said delivery being directed alternately into one and then the other of said four cycle cylinders.

It thus occurs that the two cycle cylinder and piston serve, on the compression cycle of the piston thereof, as a pump, to alternately supply the four cycle cylinders with a charge, and on the outgoing travel thereof as a motor, receiving and utilizing the contents of the four cycle cylinders as the same exhaust therefrom while said contents are above atmospheric pressure.

The four cycle cylinders and pistons have, also, an additional function to the usual ones thereof, and which I believe to be new as applied to four cycle engines, to wit, on every compression and exhaust cycle of the piston thereof, said piston functions as a pump piston, drawing a fuel mixture, or air, into the crank case thereof, and on every charging and ignition cycle it functions as a pump piston forcing the contents of its crank case, or some thereof, into the crank case of the two cycle cylinder and piston. This pump function of the piston of the four cycle cylinder assists materially in obtaining a full charge for the compression cycle of the piston of said four cycle cylinders, when the engine is being run at a high rate of speed, thus enabling me to obtain an engine adapted to perform efficient work while running at said high rate.

Figure 1 illustrates a vertical sectional view of one unit of an engine embodying this invention.

Fig. 2 a vertical sectional view on line 2— of Fig. 1, viewed in the direction indicated by the arrows, and Fig. 3 a vertical sectional view on the same line as Fig. 1, of a modification of the head of the cylinders of the unit.

A reference character applied to designate a given part indicates said part throughout the several figures of the drawing, wherever the same appears.

1 designates an illustration of the cylinder of a two cycle type engine, and 2, 2', cylinders of a four cycle type. 2$^c$ and 2'$^c$ are applied to the combustion chambers of cylinders 2, 2', respectively. 3 represents the outer walls of the unit, and 4, 4, the water chambers or spaces. 5 represents the piston of the two cycle type cylinder, and 6, 6', the pistons of the four cycle type.

It will be observed that the area of the piston of the two cycle type cylinder is considerably greater than the area of the pistons of the four cycle type cylinders, respectively. This increase of the area of the piston of the two cycle type cylinder is to provide for a rapid exhaust from the cylinder of the four cycle type which discharges thereinto, and for additional expansion of the products of combustion while therein.

7 represents the crank shaft and 7ᵇ the balance wheel of the engine. 8 represents the connecting rod between piston 5 and the wrist pin thereof on crank shaft 7, and 9, 9', the connecting rods between pistons 6, 6', and the wrist pins thereof, respectively. 10 represents the inlet ports to cylinder 1; and 11 the exhaust ports therefrom. 10', Fig. 2, represents a passage way from crank case chamber 12 to ports 10 of cylinder 5. 13, 13, are applied to designate the crank case chamber of cylinders 2, 2'. Lubricating oil is stored therein.

Crank case chamber 12 is separated from crank case chamber 13, 13, by walls or partitions 14; and 15, 15', represent check valves through which, in one direction, communication is established from chamber 13, 13, to chamber 12, and by which communication between said chambers in the opposite direction is obstructed.

16 represents a check valve through which a fuel mixture, (or air) may flow into crank case chamber 12; and by which the flow from said chamber is obstructed.

17, 17, are similar check valves to valve 16, and respectively perform similar functions, relative to crank case chamber 13, 13.

Where a carbureter is attached to the unit the ordinary manifold, indicated by broken lines 18 in Fig. 2, is interposed between said carbureter and check valves 16, and 17, 17, to supply a fuel mixture to said crank chambers 12, and 13, 13.

Cylinders 2 and 2', are respectively illustrated as provided with valves 19, 19', and said valves respectively perform the functions of an inlet and exhaust valve.

20, 20' represent passage ways which are put into communication with combustion chambers 2ᶜ and 2'ᶜ on the unseating of said valves 19, 19'; and in the construction which is illustrated in Figs. 1 and 2 said passage ways are provided with valves 21, 21', to obstruct, (when seated) communication between said passage ways and the chamber in cylinder 1 which is in advance of piston 5. In the modification which is illustrated in Fig. 3 said passage ways 20 and 20' are at all times in unobstructed communication with said chamber. Said chamber in cylinder 1 is between piston 5 and valves 21 and 21', in Fig. 1, and functions (in conjunction with piston 5) as a compression and power chamber.

22 represents packing, or its equivalent, to the stems of valves 19, 19', and 21, 21'. 23, 23, represent springs which yieldingly hold valves 19, 19', 21 and 21' seated.

24 represents a cam shaft, and 24ᵇ the bearings thereof. 25 represent cams on shaft 24. 26 represents the driving connection between cam shaft 24 and crank shaft 7. Cams 25 are in timed relation to the pistons 6 and 6'.

A plurality of valves 15, 15', and 17, 17, lessen the weight and capacity of each thereof over what is required when a single one of said valves, (15 or 15' and 17) is used; but of course I do not confine myself to the use of two of said check valves in either instance.

In the modification which is illustrated in Fig. 3 the pressure of the exhaust gases from cylinders 2, 2', when the engine is operating, is applied to the seated one of valves 19, 19'; while in the construction which is illustrated in Figs. 1 and 2 the exhaust gases from said cylinders are conducted directly into cylinder 1, through the unseated one of the valves 21, 21', and the pressure thereof extends to the seated one of said valves. Where sleeve or circular valves are substituted for the pop valves illustrated in the drawings said extension of said pressure is not objectionable, but where pop valves are used I prefer the construction which is illustrated in Figs. 1 and 2.

The engine being in operation an inspiration of air (or fuel mixture, as preferred) alternately occurs in crank chambers 12 and 13, 13; (on the combined inspiration and compression travel, (1st cycle) of piston 5, through valve 16, and on both the compression and exhaust travel (2nd and 4th cycles) of pistons 6, and 6', through valves 17). On the next half turn of crank shaft 7, (1st and 3rd cycles of pistons 6, 6'), the pressure obtained in crank chamber 13 is discharged into chamber 12 through valves 15, 15'.

Assuming, (as is illustrated) the displacement of pistons 6, 6' is substantially the same as the displacement of cylinder 5; at every revolution of the crank shaft there will be deposited in crank chamber 12 substantially double the volume of air, (or fuel mixture), required to fill, at atmospheric pressure, said cylinder 5 on the combined inspiration and compression travel thereof. An ample supply is thus obtained to insure good exhaust from said cylinder 5 at the completion of its power travel, (2nd cycle). The displacement of said piston 5 being, as assumed, equal to the displacement of both cylinders 6 and 6', and only one of said cylinders 6, 6', being on its inspiration travel (1st cycle) while piston 5 is on its combined inspiration and compression travel, (1st cycle) (the other of said cylinders 6, 6' being on its power travel, (3rd cycle)), it occurs that an ample supply of air (or fuel mixture) is obtained in cylinders 2, 2', on each and every inspiration travel of pistons 6 and 6', and said supply is forced into one of said cylinders 2, 2', on the inspiration travel of the piston thereof.

The 2nd cycle of piston 5 is the power travel thereof, and during said cycle products of combustion from cylinder 2, (or 2') flow through passage way 20 (or 20') into cylinder 1. Said flow is determined by the timed opening of valves 19 and 21, when piston 6 is on its exhaust travel, (4th cycle), and the timed opening of valves 19' and 21' when piston 6' is on its 4th cycle. On the substantial completion of the 2nd cycle of travel of piston 5 the products of combustion in cylinder 1 are discharged therefrom through ports 11, and an additional charge is received from crank chamber 12, through ports 10, 10, to be deposited in one or the other of cylinders 2, 2', as above recited.

Cylinder 2, (or 2') having received a charge of air (or fuel mixture) in the manner last above described, on the first cycle of travel of its piston 6 (or 6'), said charge is put under pressure in the combustion chamber $2^c$ (or $2'^c$) on the travel of said piston during its 2nd cycle, and upon maximum compression being obtained in said combustion chamber ignition is effected by a spark plug, (where a carbureter is used and no liquid fuel is injected thereinto), or by the injection of liquid fuel, in the ordinary way common to high pressure quick combustion engines.

In case both a carbureter and liquid fuel are used the use of a spark plug is optional.

On the 4th cycle of the travel of piston 6, (or 6'), exhaust of cylinder 2, (or 2') occurs through valve 19, passage way 20 and valve 21 (or valve 19', passage way 20' and valve 21'), as hereinbefore stated. Valves 19, 19', 21 and 21', are both inlet and exhaust valves to the several cylinders of the unit.

In the operation of this engine oil contained in crank chamber 13 is agitated by the lower ends of connections 9, 9', and held in mechanical suspension in the air (or fuel mixture) in said chamber; and hence, when a flow of said air, (or fuel mixture) from chamber 13 to chamber 12 occurs, through the check valves 15, 15' (or either one thereof) said oil, so held in suspension, will be conveyed thereby into said chamber 12, and lubrication of cylinder 1 is thus obtained.

I claim:

1. In a quick combustion engine, a two cycle cylinder and a piston therefor, and a plurality of four cycle cylinders and pistons therefor, in combination with means to direct, on the combined inspiration and compression travel of the said two cycle piston, the contents of said two cycle cylinder into said four cycle cylinders on the respective inspiration travel of said four cycle pistons, said means also arranged to direct the flow of products of combustion in said four cycle cylinders, on the exhaust travel of the pistons thereof, into said two cycle cylinder on the power travel of said two cycle piston, and an exhaust to said two cycle cylinder to direct products therein to waste.

2. In a quick combustion engine, a two cycle cylinder and piston therefor and a plurality of four cycle cylinders and pistons therefor, in combination with means to direct, on the combined inspiration and compression travel of the said two cycle piston, the contents of said two cycle cylinder into said four cycle cylinders on the respective inspiration travel of said four cycle pistons, and means to direct the respective exhausts of said four cycle cylinders into said two cycle cylinder.

3. A compound internal combustion engine comprising a two cycle cylinder, a piston therefor, a plurality of four cycle cylinders, pistons therefor, and a crank case provided with a chamber to said two cycle cylinder and an additional chamber to said four cycle cylinders, a communicating way between said chambers and means arranged to obstruct the communication through said way from said two cycle chamber to said four cycle chamber, additional ways arranged, respectively, to provide communication to said chambers, and means to obstruct said additional ways to prevent a flow of fluid therethrough from said chambers.

4. In a compound internal combustion engine, a two cycle cylinder, a piston therefor, a plurality of four cycle cylinders, pistons therefor, a crank case provided with a chamber to said two cycle cylinder and an additional chamber to said four cycle cylinders, ways arranged to permit a flow of fluid into said chambers, means to obstruct communication through said ways from said chambers, a communicating way between said chambers and means to obstruct communication through said way from said two cycle chamber to said four cycle chamber, in combination with means to admit the contents of said two cycle chamber to said two cycle cylinder on the completion of the power travel of the said two cycle piston.

5. In a compound internal combustion engine, a two cycle cylinder, a piston therefor, a plurality of four cycle cylinders, pistons therefor, a crank case provided with a chamber to said two cycle cylinder and an additional chamber to said four cycle cylinder, means to establish communication between said chambers and said additional chamber and to obstruct communication between said additional chamber and said chambers, and a shaft rotatably mounted in said crank case, in combination with connecting rods from said pistons to said shaft, the crank pins of said shaft arranged to permit synchronous travel of said four cycle pistons and travel in the opposite direction of said two cycle piston.

6. In a compound internal combustion engine, a two cycle cylinder, a piston therefor, a plurality of four cycle cylinders, pistons therefor, a crank case provided with a chamber to said two cycle cylinder and an additional chamber to said four cycle cylinders, communicating ways to said chambers and a communicating way between the two cycle chamber and the additional chamber, means to obstruct the flow in one direction through said communicating ways, in combination with a crank shaft rotatably mounted in said crank case, connecting rods from said pistons to the crank pins of said shaft, said crank pins arranged to permit synchronous travel of said four cycle pistons and the travel in opposite direction thereto by said two cycle piston.

7. In an internal combustion engine, a crank case comprising a chamber adapted to form an oil well and to contain fluid in gaseous form, an additional chamber within said first named chamber adapted to receive fluid from said first chamber, and means to obstruct the return flow of said fluid, and side walls to said chambers, in combination with a crank shaft journaled in said side walls, piston connections to said crank shaft, said connections adapted to agitate oil in said first named chamber to produce suspension of some of said oil in said fluid contents, and means to produce a flow of said fluid and suspended oil into said additional chamber.

8. In a compound internal combustion engine, a combined two cycle cylinder and compression chamber and a plurality of combined four cycle cylinder and combustion chambers, passage ways communicating with said compression and combustion chambers, means to obstruct said passage ways, a rotatably mounted crank shaft, pistons in said cylinders and a connecting rod between the respective pistons and said crank shaft, in combination with means to remove said means to obstruct, said means to remove arranged to establish communication between said compression and combustion chambers to permit a flow of fluid from said compression chamber alternately to said combustion chambers and a flow alternately from said combustion chambers to said compression chamber, in timed relation to said pistons.

9. In a compound internal combustion engine, a combined two cycle cylinder and compression chamber and a plurality of combined four cycle cylinders and combustion chambers passage ways communicating with said compression and combustion chambers, means to obstruct said passage ways, a crank case, a chamber to said two cycle cylinder and a chamber to said four cycle cylinders, a shaft journaled in said crank case, means to establish communication from said four cycle chamber to said two cycle chamber, connecting rods between said shaft and said pistons to obtain synchronous travel of said four cycle pistons and travel in the opposite direction to said two cycle piston, in combination with means to remove said means to obstruct, said means to remove arranged to establish communication between said compression and combustion chambers to permit a flow of fluid from said compression chamber to alternate ones of said combustion chambers and a flow from alternate ones of said combustion chambers to said compression chambers, said flows being in timed relation to said pistons.

WALDO G. GERNANDT.

Witnesses:
O. L. BECKWORTH,
O. J. HOBSON.